United States Patent
Jeon

(10) Patent No.: US 7,214,163 B2
(45) Date of Patent: May 8, 2007

(54) METHOD AND SYSTEM FOR CONTROLLING AN ENGINE OF A VEHICLE DURING AN UPSHIFT OF AN AUTOMATIC TRANSMISSION

(75) Inventor: Byeong Wook Jeon, Seoul (KR)

(73) Assignee: Hyundai Motor Company, Seocho-Ku, Seoul (KR)

( * ) Notice: Subject to any disclaimer, the term of this patent is extended or adjusted under 35 U.S.C. 154(b) by 246 days.

(21) Appl. No.: 10/983,544

(22) Filed: Nov. 8, 2004

(65) Prior Publication Data

US 2005/0107210 A1 May 19, 2005

(30) Foreign Application Priority Data

Nov. 17, 2003 (KR) .................. 10-2003-0081013

(51) Int. Cl.
*B60W 10/04* (2006.01)
(52) U.S. Cl. ........................................ 477/109
(58) Field of Classification Search ........... 477/107, 477/109, 110, 111
See application file for complete search history.

(56) References Cited

U.S. PATENT DOCUMENTS

| | | | |
|---|---|---|---|
| 4,680,988 A * | 7/1987 | Mori | 477/65 |
| 5,188,005 A | 2/1993 | Sankpal et al. | |
| 5,295,415 A | 3/1994 | Abe et al. | |
| 5,425,284 A * | 6/1995 | Davis | 74/335 |
| 6,866,612 B2 * | 3/2005 | Tokura et al. | 477/176 |
| 2002/0111731 A1* | 8/2002 | Jain et al. | 701/56 |
| 2004/0067817 A1* | 4/2004 | Tokura et al. | 477/107 |

FOREIGN PATENT DOCUMENTS

| | | |
|---|---|---|
| DE | 42 10 416 A1 | 12/1992 |
| KR | 100220061 | 6/1999 |

* cited by examiner

*Primary Examiner*—Roger Pang
(74) *Attorney, Agent, or Firm*—Morgan Lewis & Bockius LLP

(57) ABSTRACT

Regarding torque reduction control of an engine started during an upshift, a reference deviation is set on the basis of a predetermined vehicle parameter. Accordingly, when the current turbine speed is within the reference deviation from the target turbine speed, the torque reduction control of the engine is finished.

12 Claims, 3 Drawing Sheets

METHOD AND SYSTEM FOR CONTROLLING AN ENGINE OF A VEHICLE DURING AN UPSHIFT OF AN AUTOMATIC TRANSMISSION

CROSS-REFERENCE TO RELATED APPLICATIONS

This application claims priority of Korean Application No. 10-2003-0081013, filed Nov. 17, 2004, the disclosure of which is incorporated herein by reference.

FIELD OF THE INVENTION

Generally, the present invention relates to a method and system for controlling an engine of a vehicle during upshift. More particularly, the present invention relates to a method and system for controlling an engine of a vehicle during upshift that produces less shift shock in various driving circumstances.

BACKGROUND OF THE INVENTION

For a vehicle equipped with an automatic transmission, the driver's convenience is enhanced if shifting of speeds is automatically executed according to driving conditions such as a running speed of the vehicle. Reduction of shift shock that may occur in the process of shifting is one criteria of quality of such an automatic transmission and performance of the vehicle.

In the case of an upshift of an automatic transmission, an engine speed at a target shift-speed (i.e., a target engine speed) is lower than a current engine speed. Therefore, a shift shock can be produced when an upshift is finished before the engine speed is lowered to close to the target engine speed at the target shift-speed.

In order to determine whether the engine speed is close to a target speed, a reference value is usually set. Therefore, when such a reference value may be preferably set, such a shift shock is expected to be reduced for various driving circumstances.

The information disclosed in this Background of the Invention section is only for enhancement of understanding of the background of the invention and should not be taken as an acknowledgement or any form of suggestion that this information forms the prior art that is already known in this country to a person of ordinary skill in the art.

SUMMARY OF THE INVENTION

Embodiments of the present invention provide methods and systems for controlling an engine of a vehicle during upshift, having non-limiting advantages of reduced shift shock in various driving circumstances.

An exemplary system according to an embodiment of the present invention controls the engine during upshift, wherein the vehicle is equipped with an automatic transmission. Such a system according to an embodiment of the present invention includes a vehicle speed detector, a turbine speed detector, a controller, and an actuator. The vehicle speed detector detects a current vehicle speed of the vehicle. The turbine speed detector detects a current turbine speed of the automatic transmission. The controller produces a torque reduction signal for the engine on the basis of the current vehicle speed of the vehicle detected by the vehicle speed detector and the current turbine speed of the automatic transmission detected by the turbine speed detector. The actuator reduces a torque of the engine in response to the torque reduction signal of the controller.

The controller executes instructions for a method for controlling an engine of a vehicle according to an embodiment of the present invention.

An exemplary method for controlling an engine of a vehicle during an upshift thereof according to an embodiment of the present invention includes determining whether the automatic transmission is under an upshift; starting torque reduction control of the engine when the automatic transmission is under the upshift; detecting a current vehicle speed of the vehicle when the automatic transmission is under the upshift; determining a reference deviation on the basis of a predetermined vehicle parameter; calculating a target turbine speed on the basis of the current vehicle speed and a speed ratio of the target shift-speed for the upshift; detecting a current turbine speed; determining whether the current turbine speed is within the reference deviation from the target turbine speed; and finishing the torque reduction control of the engine when the current turbine speed is within the reference deviation from the target turbine speed.

In a further embodiment, the determining of the reference deviation determines the reference deviation from a non-linear function of the vehicle parameter.

In an alternative embodiment, the controller is programmed to start torque reduction control when the automobile transmission is under upshift, and finish torque reduction control current turbine speed is within a reference deviation from a target turbine speed. The controller is programmed to determine the reference deviation and calculate the turbine target speed.

In a further embodiment, the determined vehicle parameter is the current vehicle speed.

In another further embodiment, the non-linear function is an increasing function.

In another further embodiment, the detecting of the current vehicle speed, the determining of the reference deviation, the calculating of the target turbine speed, and the detecting of the current turbine speed are recursively executed until the current turbine speed is within the reference deviation from the target turbine speed.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

An embodiment of the present invention will hereinafter be described in detail with reference to the accompanying drawings.

Figure 1:
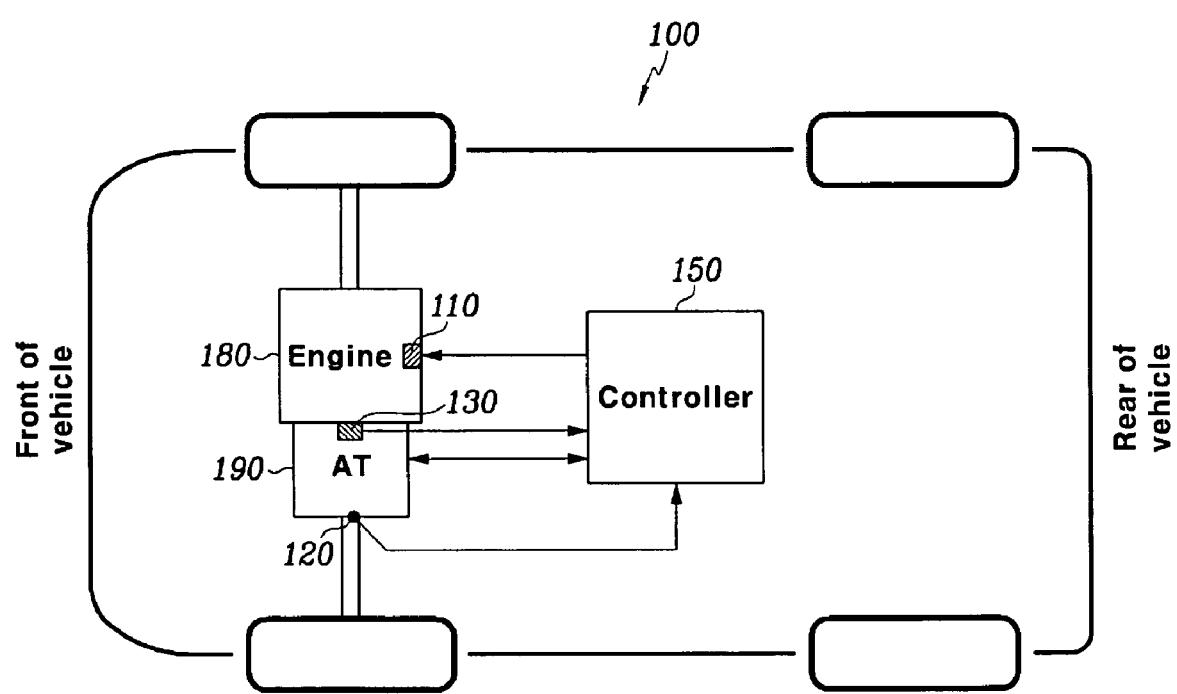
FIG. 1 is a schematic diagram of a system for controlling an engine of a vehicle having an automatic transmission during an upshift thereof according to an embodiment of the present invention.

As shown in FIG. 1, a system according to an embodiment of the present invention controls an engine 180 of a vehicle 100 during an upshift thereof, wherein the vehicle is equipped with an automatic transmission 190. Such a system may include a vehicle speed detector 120 for detecting a current vehicle speed No of the vehicle 100, a turbine speed detector 130 for detecting a current turbine speed Nt of the automatic transmission 190, a controller 150 for producing a torque reduction signal for the engine 180 on the basis of the current vehicle speed No of the vehicle 100 detected by the vehicle speed detector 120 and the current turbine speed Nt of the automatic transmission 190 detected by the turbine speed detector 130, and an actuator 110 for reducing a torque of the engine 180 in response to the torque reduction signal of the controller 150.

For example, the vehicle speed detector 120 may be realized as a sensor for detecting a rotation speed of an output shaft of the automatic transmission 190. The turbine speed detector 130 may be realized as a sensor for detecting a rotation speed of an input shaft of the automatic transmission 190. The actuator 110 may be realized as a throttle valve for controlling an amount of air drawn into the engine 180.

The controller 150 can be realized by one or more processors activated by a predetermined program, and the predetermined program can be programmed by a person of ordinary skill to perform each step of a method according to an embodiment of this invention based on the teachings herein.

A method for controlling an engine of a vehicle having an automatic transmission during an upshift thereof according to an embodiment of the present invention is hereinafter described in detail with reference to FIG. 2.

Figure 2:
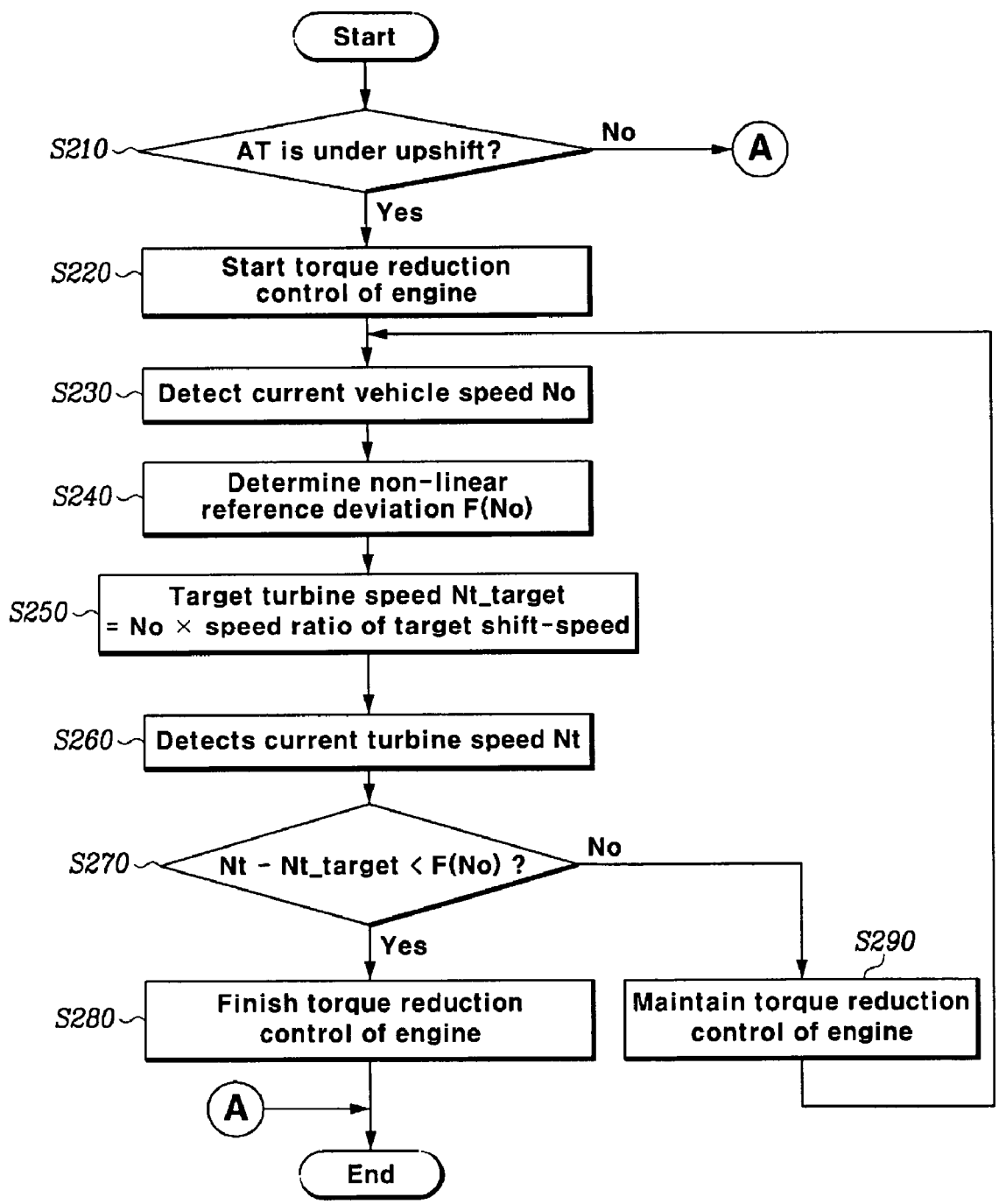
FIG. 2 is a flowchart showing a method for controlling an engine of a vehicle having an automatic transmission during an upshift thereof according to an embodiment of the present invention.

As shown in FIG. 2, according to a method for controlling an engine of a vehicle having an automatic transmission during an upshift thereof according to an embodiment of the present invention, firstly at step S210, the controller 150 determines whether the automatic transmission 190 is under an upshift.

The step S210 may be realized by, e.g., determining whether a solenoid valve of the automatic transmission 190 for the upshift is under operation. The step S210 may also be realized by the controller 150 based on information stored therein, in the case that the controller 150 controls shifting of the automatic transmission 190.

According to an embodiment of the present invention, when the automatic transmission 190 is not under an upshift, a method for controlling an engine of a vehicle having an automatic transmission during an upshift thereof stops.

At step S220, the controller 150 starts a torque reduction control of the engine 180 when the automatic transmission 190 is under an upshift. Such a torque reduction control may be realized by operating the actuator 110. For example, when the actuator 110 is a throttle valve of the engine 180, the throttle valve may be controlled to be closed.

In addition, at step S230, the controller 150 detects a current vehicle speed No of the vehicle 100 through the vehicle speed detector 120, when the automatic transmission 190 is under the upshift.

Subsequently, at step S240, the controller 150 determines a reference deviation on the basis of a predetermined vehicle parameter.

According to an embodiment of the present invention, the detected current vehicle speed No is used for the predetermined vehicle parameter. Accordingly, at the step S240, the controller 150 determines (or calculates) the reference deviation from a non-linear function of the current vehicle speed No.

Figure 3:
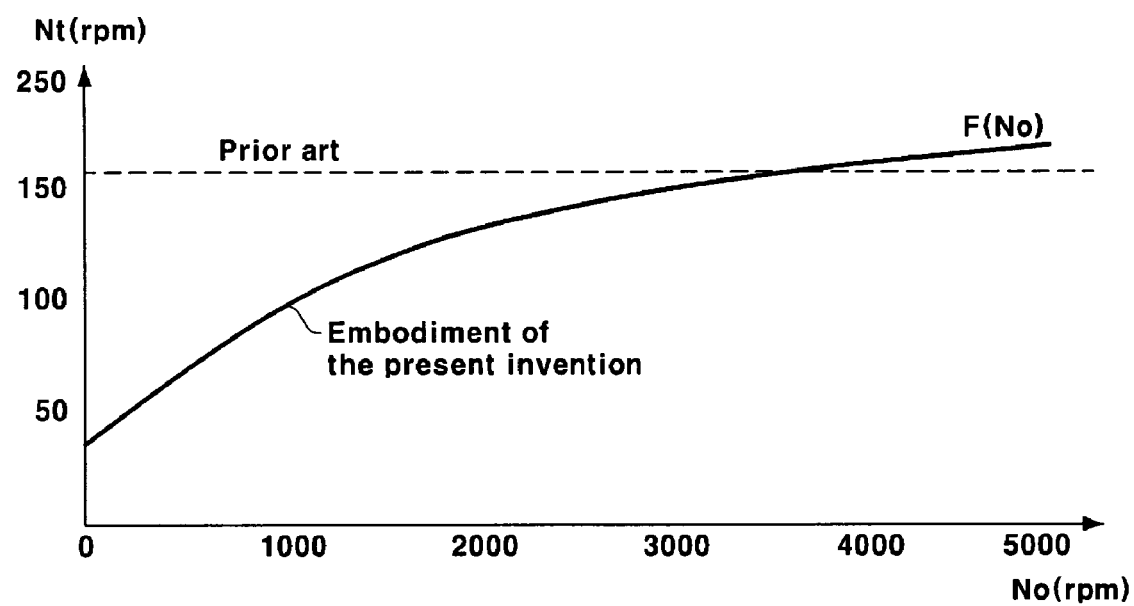
FIG. 3 illustrates an exemplary non-linear function of a reference deviation that depends on a current vehicle speed according to an embodiment of the present invention.

As shown in FIG. 3, according to an embodiment of the present invention, the reference deviation function F(No) with respect to the current vehicle speed No is a non-linear function and an increasing function that increases as the current vehicle speed No increases.

Such values of the reference deviation function F(No) with respect to the current vehicle speed No are pre-calculated and stored in the controller 150 in the form of a map table. Therefore, the controller 150 may retrieve the stored values of the non-linear function F(No) and uses them.

When the reference deviation is determined at the step S240, the controller 150 calculates, at step S240, a target turbine speed Nt_target on the basis of the current vehicle speed No and a speed ratio of the target shift-speed for the upshift.

In more detail, at the step S250, the controller 150 calculates the target turbine speed Nt_target by multiplying the current vehicle speed No with the speed ratio of the target shift-speed.

After calculating the target turbine speed Nt_target, the controller 150 detects a current turbine speed Nt of the automatic transmission 190 through the turbine speed detector 130 at step S260.

Subsequently at step S270, the controller 150 determines whether the current turbine speed Nt is within the reference deviation from the target turbine speed No. In more detail, at the step S270, the controller 150 determines whether a difference obtained by subtracting the target turbine speed Nt_target from the current turbine speed Nt is less than the reference deviation F(No).

When the current turbine speed Nt is within the reference deviation from the target turbine speed No, the controller 150 finishes the torque reduction control of the engine at step S280.

By finishing the torque reduction control of the engine at the step S280, a method for controlling an engine of a vehicle having an automatic transmission during an upshift thereof according to an embodiment of the present invention stops.

When the current turbine speed Nt is not within the reference deviation from the target turbine speed No, the controller 150 maintains the torque reduction control of the engine at step S290, and then returns to the step S230 of detecting the current vehicle speed.

Therefore, the step S230 of detecting the current vehicle speed, the step S240 of determining the reference deviation, the step S250 of calculating the target turbine speed, and the step S260 of detecting the current turbine speed are recursively executed until the current turbine speed Nt becomes within the reference deviation from the target turbine speed Nt_target.

According to an embodiment of the present invention, a reference deviation used for determining of finishing a torque reduction control of an engine during an upshift is set on the basis of a vehicle parameter. Therefore, shift shock may be reduced in a various driving circumstances.

In particular, such a vehicle parameter is set as a vehicle speed. Therefore, shift quality of an upshift becomes stable regardless of a current vehicle speed of a vehicle.

In addition, such a reference deviation is calculated by a non-linear function with respect to a current vehicle speed of a vehicle. Therefore, shift quality of an upshift is further stabilized regardless of a current vehicle speed of a vehicle.

The non-linear function is set as an increasing function. Therefore, a shift shock that tends to become greater at low vehicle speed may be precisely controlled.

In addition, the detecting of the current vehicle speed, the determining of the reference deviation, the calculating of the target turbine speed, and the detecting of the current turbine speed are recursively executed until the current turbine speed is within the reference deviation from the target turbine speed. Therefore, shift quality becomes stable even when a vehicle speed heavily fluctuates during shifting.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method for controlling an engine of a vehicle during an upshift thereof, the vehicle being equipped with an automatic transmission, the method comprising:
   determining whether the automatic transmission is under the upshift;
   starting a torque reduction control of the engine when the automatic transmission is under the upshift;
   detecting a current vehicle speed of the vehicle when the automatic transmission is under the upshift;
   determining a reference deviation as a value variable according to a non-linear function of a predetermined vehicle parameter;
   calculating a target turbine speed on the basis of the current vehicle speed and a speed ratio of a target shift-speed for the upshift;
   detecting a current turbine speed;
   determining whether the current turbine speed is within the reference deviation from the target turbine speed; and
   finishing the torque reduction control of the engine when the current turbine speed is within the reference deviation from the target turbine speed.

2. The method of claim 1, wherein the predetermined vehicle parameter is the current vehicle speed.

3. The method of claim 1, wherein the detecting of the current vehicle speed, the determining of the reference deviation, the calculating of the target turbine speed, and the detecting of the current turbine speed are recursively executed until the current turbine speed is within the reference deviation from the target turbine speed.

4. The method of claim 1, wherein the non-linear function is an increasing function.

5. The method of claim 4, wherein the detecting of the current vehicle speed, the determining of the reference deviation, the calculating of the target turbine speed, and the detecting of the current turbine speed are recursively executed until the current turbine speed is within the reference deviation from the target turbine speed.

6. A system for controlling an engine of a vehicle during an upshift thereof, the vehicle being equipped with an automatic transmission, the system comprising
   a vehicle speed detector for detecting a current vehicle speed of the vehicle,
   a turbine speed detector for detecting a current turbine speed of the automatic transmission,
   a controller to produce a torque reduction signal for the engine on the basis of the current vehicle speed of the vehicle detected by the vehicle speed detector and the current turbine speed of the automatic transmission detected by the turbine speed detector, and
   an actuator for reducing a torque of the engine in response to the torque reduction signal of the controller,
   wherein the controller is programmed to execute instructions for:
      determining whether the automatic transmission is under the upshift;
      starting a torque reduction control of the engine when the automatic transmission is under the upshift;
      detecting the current vehicle speed of the vehicle when the automatic transmission is under the upshift;
      determining a reference deviation as a value variable according to a non-linear function of a predetermined vehicle parameter;
      calculating a target turbine speed on the basis of the current vehicle speed and a speed ratio of a target shift-speed for the upshift;
      detecting the current turbine speed;
      determining whether the current turbine speed is within the reference deviation from the target turbine speed; and
      finishing the torque reduction control of the engine when the current turbine speed is within the reference deviation from the target turbine speed.

7. The system of claim 6, wherein the predetermined vehicle parameter is the current vehicle speed.

8. The system of claim 6, wherein the detecting of the current vehicle speed, the determining of the reference deviation, the calculating of the target turbine speed, and the detecting of the current turbine speed are recursively executed until the current turbine speed is within the reference deviation from the target turbine speed.

9. The system of claim 6, wherein the non-linear function is an increasing function.

10. The system of claim 9, wherein the detecting of the current vehicle speed, the determining of the reference deviation, the calculating of the target turbine speed, and the detecting of the current turbine speed are recursively executed until the current turbine speed is within the reference deviation from the target turbine speed.

11. The system of claim 6, wherein the controller is programmed to start the torque reduction control when the automatic transmission is under the upshift and finish the torque reduction control when the current turbine speed is within the reference deviation from the target turbine speed.

12. The system of claim 11, wherein the controller is programmed to determine the reference deviation and calculate the turbine target speed.

* * * * *